United States Patent [19]

Baltes et al.

[11] Patent Number: 4,710,627

[45] Date of Patent: Dec. 1, 1987

[54] METHOD AND AN APPARATUS FOR DETERMINING THE GENUINENESS OF A SECURITY BLANK

[75] Inventors: Heinrich P. Baltes, Zug; AndréM. J. Huiser, Lausanne, both of Switzerland

[73] Assignee: Lgz Landis & Gyr Zug AG, Zug, Switzerland

[21] Appl. No.: 705,741

[22] Filed: Feb. 26, 1985

Related U.S. Application Data

[62] Division of Ser. No. 364,256, Apr. 1, 1982, abandoned.

[30] Foreign Application Priority Data

Apr. 16, 1981 [CH] Switzerland ........................ 2558/81

[51] Int. Cl.[4] ................................................ G01J 1/00

[52] U.S. Cl. .................................... 250/339; 250/341

[58] Field of Search .................. 250/339, 341; 283/72, 283/85

[56] References Cited

U.S. PATENT DOCUMENTS

| | | | |
|---|---|---|---|
| 4,186,943 | 2/1980 | Lee | 283/904 |
| 4,290,630 | 9/1981 | Lee | 283/82 |
| 4,306,151 | 12/1981 | Chase | 250/341 |
| 4,371,196 | 2/1983 | von Kompski et al. | 283/72 |
| 4,524,276 | 6/1985 | Ohtombe | 250/341 |

*Primary Examiner*—Janice A. Howell
*Attorney, Agent, or Firm*—Marmorek Guttman & Rubenstein

[57] ABSTRACT

A security blank includes a sheet, and an elongated security thread connected to the sheet. The security thread may be identified upon being irradiated by electromagnetic radiation by a recognizable signature from radiation scattered therefrom; the cross-section of the security thread is other than circular or rectangular and is substantially constant over a prearranged portion of the length thereof.

17 Claims, 8 Drawing Figures

METHOD AND AN APPARATUS FOR DETERMINING THE GENUINENESS OF A SECURITY BLANK

This is a division of application Ser. No. 364,256, filed Apr. 1, 1982, now abandoned.

BACKGROUND OF THE INVENTION

In order to decrease the probability of passing counterfeit documents such as bank notes, identification cards, checks and the like, it is known to embed a security thread therein. Known security threads have the form of a flat metal band or plastic strip having a rectangular cross-section. Such security threads which are easily visible and can also easily be felt, permit a simple and rapid examination pertaining to the genuineness of the document. Insertion of the security thread into the paper or plastic layer requires, however, a costly process which is mastered by a potential counterfeiter only with difficulty.

In order to further decrease the probability of counterfeiting, and to permit an automatic determination of the presence of a security thread, and consequently the genuineness of a security blank or document, it is known from German Pat. No. 2,205,428 to provide the security thread with microscopically small holes, which, for example, represent a code pattern, which can again be read out with the aid of light rays or rays of particles. Based, however, on the current state of the art of drilling by means of a laser, a code of the aforementioned type is no longer considered a particularly secure feature attesting to the genuineness of the document.

From German Pat. No. 677,711 it is known to admix fibers of a particular shape or consistency to paper, from which bank notes or the like are to be manufactured, which have an unusual cross-section, and which can be differentiated from the fibers of the paper used for bank notes either by the naked eye, by means of a magnifying glass, or by exposure to ultraviolet radiation, where the special fibers fluoresce differently than the fibers of the standard paper in the bank notes.

From U.S. Pat. No. 1,929,828 issued to Schlitz there is known a security blank, including a sheet of fabric, having denomination indicia in the form of a line or sharply defined form of metal within the body of the fabric.

From French Pat. No. 2,107,714 there is known a bank note containing fibers of a fluorescent type, which is irradiated and the genuineness of the document determined from the radiation scattered from the bank note. The cross-section of the security thread may be either round or rectangular.

In pending application Ser. No. 342,065 one of the applicants of the present invention, Baltes, discloses a security blank with enhanced authenticating features, and a method and an apparatus for determining the genuineness of the security blank.

SUMMARY OF THE INVENTION

It is one of the principal objects of the invention to devise a security blank having a security thread, as well as a method for determining the genuineness thereof, which provides a very high degree of protection against counterfeiting, by the features attesting to the genuineness of the security thread being particularly difficult to analyze by a potential counterfeiter, and even more difficult to imitate.

This object is attained in a security blank including a sheet of a predetermined thickness by providing an elongated security thread having a width of the order of that thickness connected to the sheet. The security thread may be identified, upon being irradiated by electromagnetic radiation, by a recognizable signature from radiation scattered from the security thread. The cross-section of the security thread is other than circular or rectangular, and is substantially constant over a prearranged portion of the length thereof.

Further objects and advantages of the invention will be set forth in part in the following specification, and in part will be obvious therefrom without being specifically referred to, the same being realized and attained as pointed out in the claims hereof.

BRIEF DESCRIPTION OF THE DRAWINGS

For a full understanding of the nature and objects of the invention, reference should be had to the following detailed description, taken in connection with the accompanying drawings in which.

DESCRIPTION OF THE PREFERRED EMBODIMENTS

Figure 1:
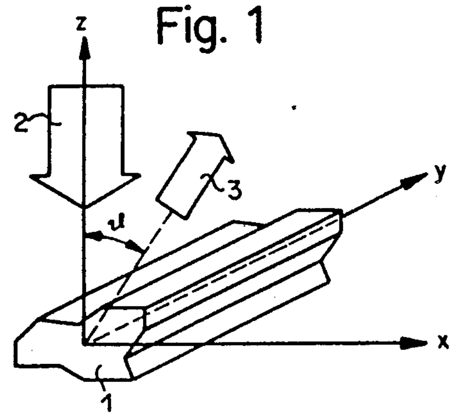
FIG. 1 is a perspective view of the security thread.

In carrying the invention into effect, and referring in particular to FIG. 1, which is a large scale perspective view of a security thread 1, it will be seen that the security thread 1 has a cross-section other than a rectangle or a circle. The material of the security thread may, for example, be synthetic material with a layer of metal, or a transparent synthetic material. The cross-section of the security thread is preferably that of an irregular polygon, having various exterior angles, some of which exceed 180°, and some of which are smaller than 180°. The cross-section of the security thread is constant, either over its entire length, or at least over a partial length thereof. The form of the cross-section represents a security feature which is the more difficult to analyze and imitate, the more complicated and the smaller the cross-section.

In FIG. 1 the security thread 1 may be seen to be disposed parallel to the y axis of the coordinate system. To determine the genuineness of the security blank, and hence of the security thread, a ray of electromagnetic radiation 2, preferably being sufficiently monochromatic, especially coherent and having a wavelength in the infrared region, is guided toward the security thread 1. The ray 2, which in the example illustrated passes within the z, x plane of the coordinate system, and impinges at right angles onto the security thread 1, is scattered therefrom in a preconceived characteristic manner. Only a relatively narrow bundle of rays 3 from the totality of scattered rays is shown in FIG. 1, the ray 3 being disposed in the z, x plane, and subtending an angle $\theta$ with respect to the ray 2.

The wavelength of the ray 2 is preferably within the order of magnitude of the cross-section of the security thread 1, namely determination for genuineness is accomplished in the so-called resonant region, in which neither the laws of geometric optics, nor the laws of the Kirchhoff approximations are valid. This has the advantage that it is practically impossible to imitate or to counterfeit the security thread 1 by a different optical element having a similar scattering effect. The cross-sectional dimensions of the security thread 1 are preferably in the order of the wavelength of infrared radiation, so that examination for genuineness with the aid of infrared radiation can be accomplished in the resonant region. It is also possible to use a relatively thick security thread 1 and still operative within the resonant region, which does, however, require the use of radiation in the far infrared region, or the use of submillimeter wavelengths, which may be accomplished, for example, by means of a laser in the farinfrared region.

Figure 2:
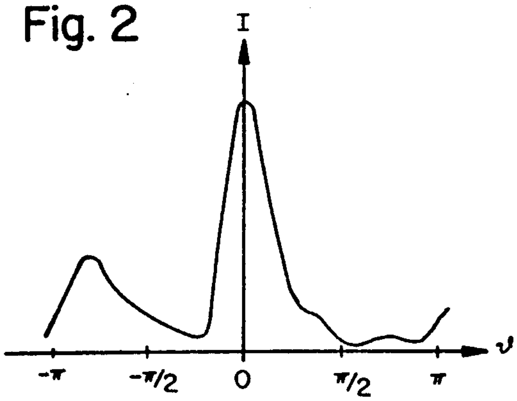
FIG. 2 is an intensity diagram of the scattered radiation, the intensity of scattering being plotted versus the scattering angle.

FIG. 2 is a plot of the intensity I of the scattered radiation in the far field of the function of the scattered angle $\theta$ in the case where the security thread 1 consists of metal, and the wavelength equals the thickness of the security thread. For a security thread made of transparent material there is obtained a different, but equally characteristic distribution of the intensity of the scattered rays. From the diagrams it will be easily seen that based on the characteristic curves $I(\theta)$, an examination of the features determining genuineness of the security thread 1 as a result of its characteristic cross-section can be obtained with a high degree of reliability, by measuring the angular distribution of intensity I.

Figure 3:
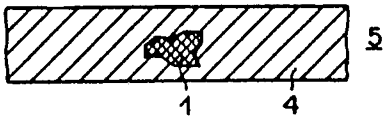
FIG. 3 is a first version of a security blank in cross-section.

According to FIG. 3 the security thread 1 can be embedded immediately in a carrier 4 of a document 5, if the carrier 4 consists, for example, of a material permeable to the electromagnetic ray 2, for example of synthetic material permitting passage of infrared radiation. In a document whose carrier absorbs the ray 2, or scatters it very strongly, the security thread 1 can be embedded in a thin covering layer. The carrier 4 has a predetermined thickness, and the security thread 7 has a width of the order of the thickness of the carrier 4.

Figure 4:
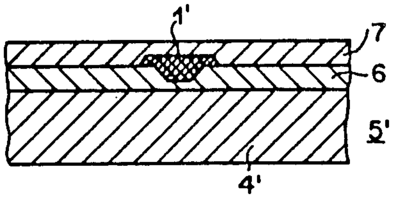
FIG. 4 is a second version of a security blank in cross-section.

In FIG. 4 there is shown a document 5' which consists of a carrier 4', an intermediate layer 6 and a covering layer 7. The security thread 1' is embedded between the intermediate layer 6 and the covering layer 7. The manufacture and deposition of the security thread 1' is accomplished according to known photolithographical methods. Thus a groove having a characteristic cross-section is obtained in the intermediate layer 6, the security thread 1' is deposited in the groove by, for example, an evaporation technique, and subsequently the layer 7 is applied thereto. A laminated synthetic foil or layer of lacquer can serve, for example, as a covering layer.

Figure 5:
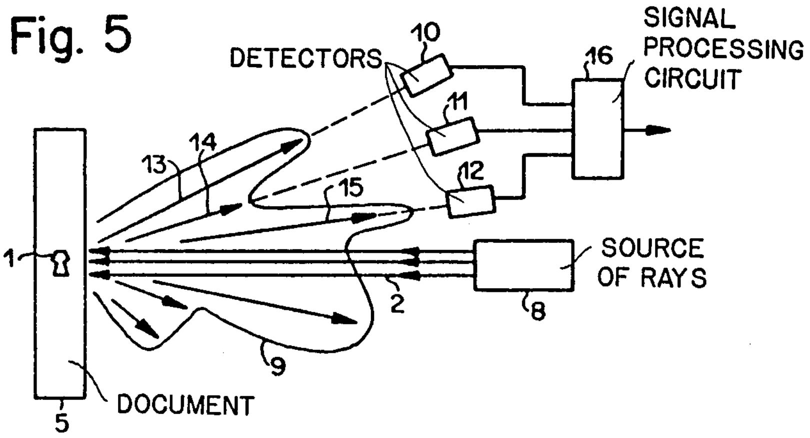
FIG. 5 is a schematic diagram of the first version of the apparatus, according to the present invention.

In FIG. 5 a source of rays 8 emits an electromagnetic ray 2, which impinges onto the document 5. The characteristic angular distribution of intensity of the rays scattered from the security thread 1 is denoted in FIG. 5 by a curve 9. By means of a plurality of ray detectors 10 through 12 positioned on the same side of the document 5 as the ray source 8 narrow bundles of rays 13 through 15 are extracted from the totality of the scattered radiation, and their intensity is measured. The ray detectors 10 through 12 are connected to an electronic signal processing circuit 16, which examines by means of the signals from the ray detectors 10 through 12, whether the ray 2 has been scattered from the security thread 1 in a preconceived characteristic manner, and if that has been the case, provides a YES signal on its output. To discriminate the useful signal, namely, the scattered radiation, from the background radiation, for example, radiation which has not been scattered from an object, phase-sensitive detection electronics (so called lock-in-detection) are advantageously employed.

As the cross-section of the security thread 1 is constant over at least a prearranged portion of its length, it is not necessary to adjust the document 5 in relation to the position of the ray 2 in the longitudinal direction of the security thread 1.

Measurement of the angles of distribution of intensity of the scattered radiation is accomplished in the arrangement shown in FIG. 5 in reflection. The angular intensity distribution can, however, also be measured in transmission; here it is only necessary to dispose the source of rays 8 on a side of the document 5 opposite to that of the ray detectors 10 through 12.

Figure 6:
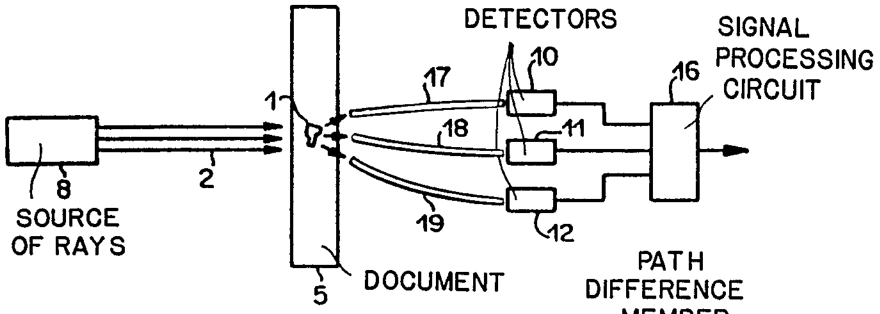
FIG. 6 is a schematic diagram of a second version of the apparatus, according to the present invention.

In the arrangement according to FIG. 6 the document 5 is positioned between the ray source 8 and the ray detector 10 through 12. The ray 2 penetrates the document 5 and is scattered in a preconceived manner at the security thread 1. The measurement of angular distribution of the scattered rays is accomplished with the aid of light guidance means 17 through 19; one end of each light guidance means is disposed near the surface of the document 5, and its other end communicates with the ray detectors 10 through 12. An arrangement of this type permits measurement of the angle of distribution in the near field if the light guidance means 17 through 19 are positioned sufficiently close to the security thread 1, and is particularly advantageous for examining the genuineness of documents in which the security thread 1 has been embedded in a diffusely scattering material.

A single light guidance means, and a single ray detector can be used in lieu of the light guidance means 18 through 19, and the ray detectors 10 through 12. In an arrangement of this type the document 5 is moved along the output of the light guidance means in a direction perpendicular to the longitudinal direction of the security thread 1, and in the signal processing circuit the measured intensity of distribution is compared to predetermined stored values.

Figure 7:
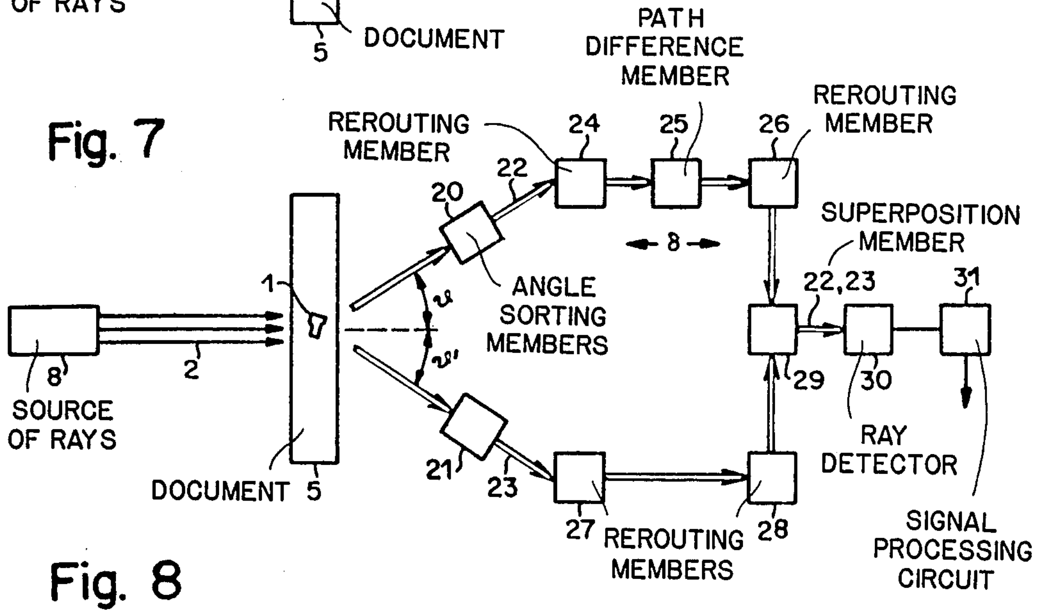
FIG. 7 is a schematic diagram of a third version of the apparatus, according to the present invention.

In the arrangement according to FIG. 7 the document 5 is positioned between the ray source 8 and the ray detectors 10 through 12. The ray 2 penetrates the document 5 and is scattered in a preconceived manner at the security thread 1. The radiation scattered from the security thread 1 impinges onto anglesorting members 20 and 21; each processes a narrow bundle of rays 22 or 23, respectively, at an advantageously changeable average angle of scattering $\theta$ or $\theta'$. The bundle of rays 22 passes through a rerouting member 24, a path-difference member 25, as well as a rerouting member 26 to a superposition member 29, and the bundle of rays 23 passes through the rerouting members 27 and 28 to the same superposition member 29, which reunites the bundles of rays 22 and 23. The path-difference member 25 generates an adjustable optical path difference $\delta$. The reunited bundles of rays 22 and 23 impinge on a ray detector 30, which is connected to an electronic singal-processing circuit 31.

At the detection surface of the ray detector 30 there appears an interference pattern in view of the interference between the bundles of rays 22 and 23, the intensity of which $I=I(\delta)$ varies in dependence of the optical path difference $\delta$. The signal-processing circuit 31 determines from the maximal value and from the minimal value of the intensity $I=I(\delta)$ the so-called contrast $|\mu|$ of the interference pattern. This contrast is a parameter dependent from the degree of coherence of the ray bundles 22 and 23. The degree of coherence measured is a function of the scattering angle $\theta$ and $\theta'$, and is compared in the signal processing circuit with desired stored values.

During measurement of the degree of coherence the document 5 is preferably moved parallel to the longitudinal direction of security thread 1, so as to form an average value over a prearranged portion of the length of the security thread 1. The measurement of the degree of coherence permits a reliable determination of the presence of the security thread 1, even if the security thread 1 is embedded in a diffusely scattering medium. Instead of the contrast $|\mu|$ it is also possible to measure intensity correlation of the second order $g^{(2)}$, which is also a measure for the degree of coherence.

Figure 8:
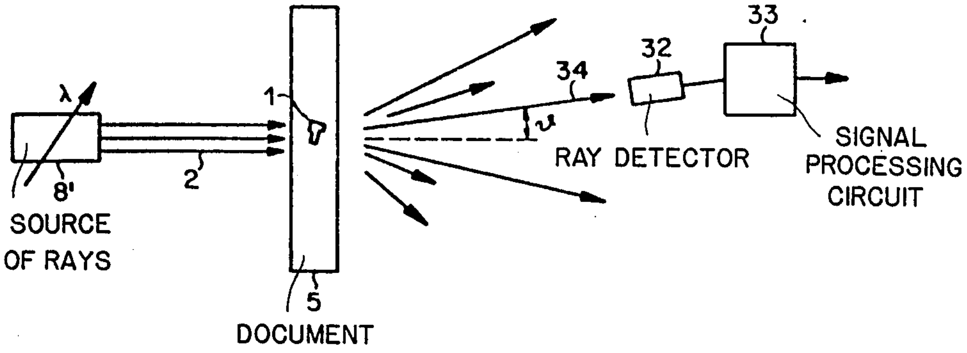
FIG. 8 is a schematic diagram of a fourth version of the apparatus, according to the present invention.

The arrangement shown in FIG. 8 consists of a source or rays 8' whose wavelength $\lambda$ is adjustable, a ray detector 32 and a signal processing circuit 33. The document 5 is positioned between the ray source 8' and the ray detector 32. The ray 2 penetrates the document 5 and is scatttered in a preconceived manner at the security thread 1. The source of rays 8' can be implemented, for example, by means of a dye laser or a light source having a gap and a sky filter. The ray detector 32 sorts out a narrow bundle of rays 34 from the scattered radiation and measures its intensity which is dependent from the scattering angle $\theta$ and the wavelength $\lambda$. In order to determine the genuineness of the document 5, the wavelength $\lambda$ of the ray 2 is varied, the degree of the dependence on the wavelength $\lambda$ of the intensity of the bundle of rays 34, namely, the dispersion is measured, and is in the signal-processing circuit 33 compared with stored desired values.

By suitably shaping the cross-section of the security thread 1 or 1', by the choice of the number of measuring points of the intensity measurement, measurement of the degree of coherence, or of the dispersion in dependence of the scattering angle $\theta$, and in dependence of the wavelength $\lambda$, it is possible to match the security against counterfeiting to prevailing requirements. It is possible to calculate the angle of distribution of the intensity of the scattered radiation even for very complicated cross-sections within the resonant region, and on the other hand it is also possible to search for cross-sections, which provide a particularly significant scattering property for a predetermined wavelength $\lambda$ and direction of impact of an electromagnetic ray 2.

We wish it to be understood that we do not desire to be limited to the exact details of construction shown and described, for obvious modifications will occur to a person skilled in the art.

Having thus described the invention, what we claim as new and desire to be secured by Letters Patent is as follows:

1. In a method of determining the genuineness of a security blank, including an elongated security thread of predetermined dimensions, said security thread having a cross-section constant throughout a portion of its length and other than circular or rectangular, the steps comprising securing said elongated thread to said security blank, directing rays of electromagnetic radiation having a wavelength of the order of said predetermined dimensions onto said security thread, at least some of said rays being scattered form said security thread in a preconceived characteristic manner, detecting the rays scattered from said security thread as a function of the angle between the incident rays directed onto said security thread and the scattered rays therefrom and electronically processing the measured angular distribution of intensity of said scattered rays to determine whether said radiation has been scattered in a preconceived characteristic manner from said security thread, whereby the genuineness of said security blank is determined by a comparison of said characteristic angular distribution of the intensity of the detected radiation with predetermined stored values.

2. In a method as claimed in claim 1, further comprising the steps of forming two narrow bundles of rays from any radiation scattered from said security thread, and measuring the degree of coherence between said two bundles of scattered rays.

3. In a method as claimed in claim 1, further comprising the steps of forming at least one narrow bundle of rays from any radiation scattered from said security thread, varying within predetermined limits the wavelength of said electromagnetic radiation directed onto said security thread, and measuring the intensity of said narrow bundle of scattered rays as a function of said wavelength.

4. A method as claimed in claim 1, wherein said scattered rays are detected only if the angles between the incident rays directed onto said security thread and the scattered rays therefrom are in the range from 90° to 180°.

5. A method as claimed in claim 1, wherein said scattered rays are detected only if the angles between the incident rays directed onto said security thread and the scattered rays therefrom are in the range from 0° to 90°.

6. A security system comprising in combination, at least one security blank, and genuineness determining means for determining the genuineness of said security blank, each security blank including an elongated thread, said security thread having a characteristic shaped cross section, said cross section being substantially constant over at least a portion of the length of said security thread, the measurable distances of said cross section being on the order of the wavelength of the electromagnetic radiation used to evaluate said security thread, said security thread being capable of scattering incident electromagnetic radiation into a preconceived characteristic angular distribution due to said characteristic shaped cross section of said security thread; and said genuineness determining means including directing means for directing rays of electromagnetic radiation having the wavelength of the order of said cross section of said security thread onto said security blank, so that there results said preconceived characteristic angular distribution due to scattering of said electromagnetic radiation on said characteristic shaped cross section of said security thread, detecting means for detecting the rays scattered from said security thread and processing means for electronically processing the detected radiation to determine whether it has been scattered in a preconceived characteristic manner from said security thread, whereby the genuineness of said security blank is determined in dependence of the scattering characteristics of the detected radiation.

7. A security system as claimed in claim 6, wherein said detecting means includes means for detecting the radiation as a function of an angle formed between a ray directed onto said security thread and a ray scattered therefrom, and further comprising means for measuring the intensity of the rays scattered from said security thread as a function of said angle.

8. A security system as claimed in claim 6, wherein said detecting means includes means for forming two narrow bundles of rays from any radiation scattered from said security thread, and means for measuring a degree of coherence between said two bundles of scattered rays.

9. A security system as claimed in claim 6, wherein said detecting means includes means for forming at least one narrow bundle of rays from any radiation scattered from said security thread, means for varying within predetermined limits the wavelength of said electromagnetic radiation directed onto said security thread, and means for measuring an intensity of said narrow bundle of scattered rays as a function of said wavelength.

10. A security system as claimed in claim 6, wherein said genuineness determining means includes means for moving said security blanks parallel to the longitudinal direction of said security thread, whereby the genuineness of said security blank is determined in dependence of the average value, over a prearranged portion of the length of said security thread, of the scattering characteristics of the detected radiation.

11. An apparatus for determining the genuineness of a security blank, containing an elongated thread capable of scattering incident electromagnetic radiation, comprising in combination, directing means for directing rays of electromagnetic radiation having a wavelength in the order of the cross section of said security thread onto said security blank, so that there results a preconceived characteristic scattering of said electromagnetic radiation on said characteristic shaped cross section of said security thread, detecting means for detecting the rays scattered from said security thread and processing means for electronically processing the detected radiation to determine whether it has been scattered in a preconceived characteristic manner from said security thread whereby the genuineness of said security blank is determined in dependence of the scattering characteristics of the detected radiation.

12. An apparatus as claimed in claim 11, wherein said detecting means includes means for detecing the radiation as a function of an angle formed between the rays directed onto said secuity thread and the rays scattered therefrom, and further comprising means for measuring the intensity of the rays scattered from said security thread as a function of said angle.

13. An apparatus as claimed in claim 11, wherein said detecting means includes means for forming two narrow bundles of rays from any radiation scattered from said security thread, and means for measuring a degree of coherence between said two bundles of scattered rays.

14. An apparatus as claimed in claim 11, wherein said detecting means includes means for forming at least one narrow bundle of rays from any radiation scattered from said security thread, means for varying within predetermined limits the wavelength of said electromagnetic radiation directed onto said security thread, and means for measuring an intensity of said narrow bundle of scattered rays as a function of said wavelength.

15. An apparatus as claimed in claim 11, wherein said genuineness determining means includes means for moving said security blank parallel to the longitudinal direction of said security thread, whereby the genuineness of said security blank is determined in dependence of the average value, over a prearranged portion of the length of said security thread, of the scattering characteristics of the detected radiation.

16. In a method of determining the genuineness of a security blank, including an elongated security thread of predetermined dimensions, said security thread having a cross-section constant throughout a portion of its length and other than circular or rectangular, the steps comprising securing said elongated thread to said security blank, directing rays of electromagnetic radiation having a wavelength of the order of said predetermined dimensions onto said security thread, at least some of said rays being scattered from said security thread in a preconceived characteristic manner, detecting the rays scattered from said security thread in two narrow bundles under predetermined angles measured between the incident rays directed onto said security thread and said bundles therefrom, and measuring the degree of coherence between said two bundles of scattered rays.

17. In a method of determining the genuineness of a security blank, including an elongated security thread of predetermined dimensions, said security thread having a cross-section constant throughout a portion of its length and other than circular or rectangular, the steps comprising securing said elongated thread to said security blank, directing rays of electromagnetic radiation having a wavelength of the order of said predetermined dimensions onto said security thread, at least some of said rays being scattered from said security thread in a preconceived characteristic manner, detecting the rays scattered from said security thread in a least one narrow bundle under a predetermined angle measured between the incident rays directed onto said security thread and said bundle therefrom, varying within predetermined limits the wavelength of said incident electromagnetic radiation directed onto said security thread, and measuring the intensity of said narrow bundle of scattered rays as a function of said wavelength.

* * * * *